(12) United States Patent
Hrusecky et al.

(10) Patent No.: US 6,898,327 B1
(45) Date of Patent: May 24, 2005

(54) ANTI-FLICKER SYSTEM FOR MULTI-PLANE GRAPHICS

(75) Inventors: David A. Hrusecky, Johnson City, NY (US); Roger S. Rutter, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,002

(22) Filed: Mar. 23, 2000

(51) Int. Cl.$^7$ ................................................ G06K 9/40
(52) U.S. Cl. ..................... 382/260; 382/275; 348/606
(58) Field of Search ............................... 382/232–233, 382/298–299, 239–240, 244–247, 254, 260–265, 268, 270, 274–275; 386/124; 430/611; 341/59; 348/446–447, 450, 458, 459, 563–568, 606–629, 673, 694, 692, 222.1–226.1, 470; 345/629, 620, 694, 692, 204–530, 3.1, 611, 213; 375/240.01–240.02, 240.25, 240.29, 240.21; 358/426.01, 426.09

(56) References Cited

U.S. PATENT DOCUMENTS

| | | | |
|---|---|---|---|
| 4,602,273 A | 7/1986 | Carlson ...................... | 348/450 |
| 4,663,653 A | 5/1987 | Patel .......................... | 348/450 |
| 4,701,793 A | 10/1987 | den Hollander et al. .... | 348/447 |

(Continued)

FOREIGN PATENT DOCUMENTS

| | | | | |
|---|---|---|---|---|
| JP | 4-4677 | 4/1990 | ............ | H04N/5/21 |
| JP | 9-200578 | 8/1996 | ............ | H04N/5/21 |

OTHER PUBLICATIONS

Aggarwal, Method for the Suppression of Flicker on interlaced color images, IBM Technical Disclosure Bulletin, vol. 30, No. 4 pp. 1543–1545.*

J. K. Aggarwal; "Method for the Suppression of Flicker on Interlaced Color Images"; IBM Technical Disclosure Bulletin, vol. 30, No. 4; Sep. 1987; pp. 1543–1545.

*Primary Examiner*—Leo Boudreau
*Assistant Examiner*—Ishrat Sherali
(74) *Attorney, Agent, or Firm*—Whitham, Curtis & Christofferson, P.C.

(57) ABSTRACT

Flickering artifacts are removed from a displayed image by storing digital luminance values in a compressed form using disallowed luminance values clipped from a range of luminance values to encode run lengths of identical values of truncated luminance values and bits corresponding to bits truncated from the luminance values. A correction value is derived from a filter transfer function computed by summing an increase in correction value above a threshold within a range of luminance differences with a maximum change in correction value in each lower range, this providing a piecewise linear substantially quadratic transfer function without discontinuities that would engender other image artifacts. The non-linearity of the transfer function is this adaptive to different image conditions and types in regions of respective image planes and the correction factors implemented by the transfer function are freely adjustable to accommodate, for example, different scanning standards and display refresh rates.

23 Claims, 10 Drawing Sheets

U.S. PATENT DOCUMENTS

| | | | |
|---|---|---|---|
| 4,763,120 A | | 8/1988 | Morrish et al. .............. 345/694 |
| 4,849,807 A | * | 7/1989 | Music et al. ........... 375/240.01 |
| 4,914,508 A | * | 4/1990 | Music et al. ........... 375/240.01 |
| 5,053,764 A | | 10/1991 | Barbier et al. ............... 345/692 |
| 5,119,200 A | | 6/1992 | Van Den Hombergh et al. ......... 348/563 |
| 5,136,385 A | * | 8/1992 | Campbell .................... 348/607 |
| 5,247,354 A | * | 9/1993 | Nakajima ................... 348/621 |
| 5,254,456 A | | 10/1993 | Yamashita et al. .......... 430/611 |
| 5,428,456 A | | 6/1995 | Parulski et al. ............. 386/124 |
| 5,510,843 A | | 4/1996 | Keene et al. ............... 348/446 |
| 5,519,452 A | | 5/1996 | Parulski ...................... 348/620 |
| 5,708,480 A | | 1/1998 | Bromba et al. ............. 348/620 |
| 5,754,247 A | | 5/1998 | Tauchi ........................ 348/459 |
| 5,822,009 A | * | 10/1998 | Keating et al. ............. 348/458 |
| 5,828,366 A | * | 10/1998 | Hurst ......................... 345/204 |
| 5,850,263 A | | 12/1998 | Tauchi ........................ 348/459 |
| 5,894,330 A | | 4/1999 | Huang et al. ............... 348/447 |
| 5,943,036 A | | 8/1999 | Tanaka ....................... 345/620 |
| 6,442,206 B1 | * | 8/2002 | Hrusecky ............... 375/240.21 |
| 6,542,162 B1 | * | 4/2003 | Hrusecky et al. ........... 345/629 |

* cited by examiner

EXAMPLE OF COMPRESSION USING QUANTIZAION OF 2 BITS WITH 32 POSSIBLE EXTENDED RUN CODES

| INPUT PIXEL # | LUMINANCE DATA(8 BITS) | COMPRESSED DATA (8 BITS) | COMPRESSED OUTPUT DATA |
|---|---|---|---|
| 1 | A | A(6 BITS) ∥ "00" | 0 |
| 2 | B | | |
| 3 | B | B(6 BITS) ∥ "01" | 1 |
| 4 | C | C(6 BITS) ∥ "00" | 2 |
| 5 | D | | |
| 6 | D | | |
| 7 | D | | |
| 8 | D | D(6 BITS) ∥ "11" | 3 |
| 9 | D | | |
| 10 | D | | |
| 11 | D | | |
| | | | |
| 22 | D | | |
| 23 | D | 0–16 | |
| 24 | D | "0000" ∥ "1111" | 4 |
| 25 | E | | |
| 26 | E | | |
| 27 | E | | |
| 28 | E | E(6 BITS) ∥ "11" | 5 |
| 29 | E | | |
| | | | |
| 58 | E | | |
| 59 | E | 17–32 | |
| 60 | E | "1111" ∥ "1111" | 6 |
| 61 | F | | |
| 62 | F | F(6 BITS) ∥ "01" | 7 |
| 63 | G | | |

NOTE: ∥ MEANS CONCATENATION

FIG. 8

ANTI-FLICKER SYSTEM FOR MULTI-PLANE GRAPHICS

BACKGROUND OF THE INVENTION

1. Field of the Invention

The present invention generally relates to refreshed image displays from digitally transmitted data and, more particularly, to removal of flickering artifacts resulting from interlaced raster scanning.

2. Description of the Prior Art

It has long been recognized that visual displays are a powerful communication tool, particularly for allowing rapid assimilation of information by a viewer. Further, it has been recognized that the utility of computers is limited by the amount of information which can be communicated to a user. Accordingly, the overlaying of display frames and information has become widespread and popular to increase the amount of information which can be displayed within an area limited either by the physical dimensions of the display or the user's field of view. The overlaying of information is generally handled in planes (any of which may include transparent regions to allow viewing of portions of underlying information) which can be rearranged in order along a virtual line of sight of the user. This technique also may be useful in rendering of images of three-dimensional shapes.

The limitations of the available broadcast spectrum as well as the demand for pictorial information has led to the development of additional distribution media such as satellite transmission and cable. Demand for even higher transmission capacity and the degradation of signals by noise has led to digital communication of such pictorial information. Further, the growth of computer network communications has led to compression schemes whereby motion pictures and animation can be transmitted through relatively low bandwidth telephone lines in substantially real time. It can be appreciated that this latter capability requires substantial reduction in data transmission rate, extreme compression and sophisticated error correction and compensation techniques to present an acceptable display. Such compression and digital transmission also greatly increases the transmission capacity of broadband communication links including satellite, microwave and fiber-optic links.

It can be readily understood that virtually any display apparatus will require some degree of quantization of an image. For example, a raster scanned display necessarily requires the image to be dissected into raster lines even though many lines may be provided to preserve a substantial amount of the resolution in the original image. Resolution may thus be quite high even though limited by, for example, the optics and medium used to capture the image (e.g. sensor area or film grain size). If the graphical information is transmitted digitally, there will be additional quantization in luminance and chrominance. Of course, greater resolution in luminance (or chrominance) requires a greater number of bits of luminance (and/or chrominance) information to be transmitted.

These quantizations of the image, separately or in combination, may produce artifacts to which the user may be more or less sensitive. While standards based on practical levels of hardware complexity and bandwidth provide generally acceptable spatial and luminance resolution of a display, increased resolution is constantly sought but is always limited by practical economic factors.

Current practical limitations of data transmission rate and bandwidth have caused the adoption of interlaced raster scans for display of digitally transmitted data on cathode ray tubes and the like. This technique exploits the relatively long persistence/slow negrescence of phosphors and other devices after excitation and allows the refresh rate for the display to be reduced to somewhat below the so-called flicker fusion frequency of the human eye to allow a reduced data transmission rate (one-half the spatial resolution) while generally presenting a display of acceptable appearance. However, the interlaced scan in combination with low refresh rate and either or both forms of spatial and luminance quantization discussed above can form other visual artifacts to which the human eye is quite sensitive given certain image conditions.

In particular, where pixels of substantially differing luminance are provided in the displayed image at corresponding points in adjacent raster lines produced in alternating interlaced fields, the higher luminance pixel will be perceived to flicker at half the frequency of the interlaced fields. The severity of the flickering will vary with the difference in luminance of these vertically (orthogonal to scan line direction) adjacent pixels.

The difference (or gradient over the distance between interlaced scan lines) in luminance substantially equates with contrast in the image. The overlaying of image planes alluded to above generally includes a facility for adjustment of size/dimensions of a window on the display. When a full image frame is displayed in a window of decreased size or the image otherwise downscaled, contrast is usually increased; aggravating the flickering effect.

This artifact is of sufficient irritation to most viewers that numerous filtering techniques which adjust the relative luminance of vertically adjacent pixels have been developed. While all are effective to a degree, many require a trade-off between reduction of the artifact and the engendering of other artifacts or compromise of image fidelity beyond that of quantization since all rely on adjustment of luminance values of one or more of the vertically adjacent pixels from which flickering is observed. Further, practical implementations must consider computational complexity within an environment having severe time constraints imposed by the human flicker fusion frequency.

For example, pages 1543–1544 of an IBM TDB of September, 1987, by J. K. Aggarwal describes a technique of computing a luminance difference, imposing a threshold and, when the threshold is exceeded, scaling the difference value by a correction factor and combining this scaled correction value back into the original luminance value, either additively for the lesser luminance pixel or subtractively for the higher luminance pixel. A graphical depiction of the correction transfer function of such a filter is shown in FIG. 1. Such a filter can engender a visible step artifact at the detection threshold such as at a location where the image may contain a relatively smooth horizontal gradient in luminance over an area.

It should also be recognized that different frame rates have become standards in different countries, such as the United States and Europe. Therefore, flickering will be observed under different image conditions and different correction factors are required even if only a single correction factor is to be applied at a threshold. Therefore, since the correction factor, n, is fixed in FIG. 1, the filter transfer function is not adjustable.

Further, a single threshold and a single correction factor may overcorrect luminance near the threshold and still allow substantial (although somewhat reduced) flicker to be perceived for luminance differences well above the threshold.

That is, in order to reduce flicker where a high luminance difference occurs between vertically adjacent pixels, it is necessary to utilize an increased correction factor.

Different correction factors are graphically depicted as filter transfer functions having different slopes in FIG. 2. However, increased correction factors alter the image in a manner which is perceived as increased blurring or loss of delicate graphic features that have a low luminance difference (e.g. near a luminance difference threshold). Thus, if the correction factor of FIG. 1 could be changed to correspond to any one of the correction factors shown in FIG. 2 and used with the single threshold of FIG. 1, adjustability would be provided to accommodate, for example, different frame rates but at the expense of possibly aggravating step luminance artifacts and degrading the image through blurring while still not providing adaptability to different luminance differences between vertically adjacent pixels in the image.

Multiple correction filters may be used to reduce the amount of such blurring of the image. In this case, multiple correction factors are made available as depicted in FIG. 2 and switching between the correction factors is performed at different thresholds as depicted in FIG. 3. Different transfer functions can be derived by the manner in which the corrected value components are combined as depicted by the two solid lines of FIG. 3 approximating different and slightly varying slopes. That is, some degree of overall adaptive non-linearity may be simulated in this manner while the filter transfer function remains piecewise linear. However, such switching also engenders step artifacts at all thresholds since the filter transfer function includes a step discontinuity at each threshold.

Selectivity between filters such as filters corresponding to the solid lines in FIG. 3 can be achieved by evaluation of additional pixels at the cost of additional storage and computational burden. For example, similar luminance above or below the pixels which may cause flicker may be evaluated to determine an edge and a higher correction factor employed while a large difference in luminance value of a small number of pixels may indicate an image detail to which only a small correction factor should be applied.

(It should be noted that while FIG. 1 is designated "PRIOR ART", FIGS. 2 and 3, while not illustrating the invention, are provided to assist in conveying an understanding of the invention by contrast therewith. Accordingly, no portion of FIG. 2 or 3 is admitted to be prior art in regard to the present invention.)

In summary, no known arrangement provides good suppression of image flicker without significant image degradation. Many known arrangements rely on balancing the effects of a flickering artifact with another type of artifact such as a step artifact which results from the computation of the flicker correction to be applied. Computational and hardware complexity and cost have limited the provision of adjustability and/or adaptive behavior of known flicker filter arrangements and thus do not eliminate flicker under all conditions or accommodate different display standards. Conversely, filter transfer functions of flicker filters of acceptable simplicity and economy generally exhibit discontinuities such as the step discontinuities of FIGS. 1–3 which engender other objectionable artifacts and/or compromise image fidelity while providing differing degrees of flicker reduction.

It should be recognized that the comparison of two vertically adjacent pixel luminance values requires storage of luminance values (either original or corrected) corresponding to an entire interlaced field (one-half of all pixels displayed) as well as a substantial computational burden which must be performed in substantially real time. Such storage capacity can only be achieved with substantial hardware cost even though special purpose chips for such purposes are commercially available. In digital transmission systems capable of processing digital image data, such buffering must be done prior to the digital encoder which is generally integrated with other processing structure (e.g. decompression processor) and access to the digital encoder is thus often very difficult and clumsy, if possible at all.

Further problems are associated with multiple images. One proposal for so-called "picture-in-picture" displays is to double sample both the main image and the small image. However, such an approach would require storage of a full interleaved field of each image and substantial computational overhead which would not contribute to the final displayed image (e.g. the portion of the large image occluded by smaller images). Another suggested approach is described in U.S. Pat. No. 5,850,263 and involves sampling a full frame on a field basis and filtering each field with a different coefficient or correction factor to reduce flickering. However, while possibly reducing computational burden and allowing application of different correction factors, this approach blurs the interlaced fields. Therefore, the image would be of very poor quality if used on computer generated graphics images and only marginally acceptable with video images; requiring different treatment by a programmer or user. Neither of these approaches accommodates multiple image planes.

Accommodation of multiple image planes is considered desirable to the point of being virtually required in a digital image transmission set-top box used to receive and decode a digital transmission and generate signals suitable for application to a television set, sometimes referred to under the MPEG-2 standard as a target decoder (as distinct from various signal processing and decoding elements within it). Multiple image planes are generally necessary in order to provide the programmer or user with the capability of easily and efficiently organizing the display presentation to cleanly add or remove new images and text to the screen without disturbing images that are already being presented or to the selection and editing or rearrangement thereof independently of other images.

Such organization of the display can be performed at the transmitter by a programmer that may also apply a particular form or amount of flicker filtering to each image plane, depending on the source and content thereof. The user may also desire control of arrangement of the display to include multiple images from multiple sources but is generally not involved in the choice of filtering. Separate planes may also facilitate handling of different types of image information. For example, one plane may be dedicated to a video source while other planes may be separately used for text display or other images, either full-size or scaled.

In any case, the programmer knows the origin of the source material used in the various planes and is aware of the need to flicker filter a display that may be expected to flicker. Conversely the programmer would know that a display which would not be expected to flicker should not be flicker filtered in order to maximally preserve image fidelity. The programmer will also have empirical knowledge of the preferred filter to select for each type of image and its source. The flicker filter selection problem is at its worst when the set-top box is being used for Internet access by presenting multiple planes of web-based images and text while simultaneously viewing a downscaled MPEG video stream or still image while a background plane may be showing a video stream or still image that has not been downscaled.

One way of performing flicker filtering in such a case would be to apply a flicker filter to the image of each plane appropriate to the type of image data contained therein. However, such an approach would require double sampling, as alluded to above, for each image plane and storage hardware would become prohibitive to do so for far fewer than the number of planes (e.g. five or more) it is much preferred to provide.

Additionally, as alluded to above, while a processor of substantial power is necessary in a set-top box for decompression and error recovery or concealment in substantially real time, the processing demands of such a function are very substantial and may vary quickly when digital image transmissions are made over a lossy medium such as the Internet. Other hardware is generally provided for digital audio decoding in as many formats as possible, transport demultiplexing of digital audio and video packets, digital to analog encoder (DENC) and graphics features such as line and polygon drawing and fills, text rendering, support for multiple graphics resolutions and support for multiple graphics planes containing images, text, video or cursor in mixed combinations including facilities for windowing, downscaling, zooming and other image manipulations.

Generally an on-chip microprocessor is also included to support user programmable features such as implementation of Internet access, interactive data services, program guides and local on-demand information such as navigation of menus. The on-chip processor is therefore not used for any of the functions noted in the preceding paragraph and should not be used for image enhancement or image artifact removal in order to avoid compromise of the functions for which it is intended.

Therefore, it can be seen that the amount of image processing hardware required to provide features demanded by the market is very extensive and of very substantial cost even when special purpose chips are manufactured in production quantities. Present hardware presents substantial difficulties in implementing flicker filters which may also require extensive hardware for only marginally satisfactory performance. The on-chip microprocessor cannot realistically be used to implement flicker filters and no filtering arrangement is known that can be implemented at an economically viable cost which does not cause a trade-off between the severity of different types of artifacts or which is reasonably effective on all ranges of contrast differences in all types of images and, in particular, images which can be manipulated at the will of the user in a manner which will generally alter the likelihood of production of objectionable flicker effects and the severity thereof.

SUMMARY OF THE INVENTION

It is therefore an object of the present invention to provide an adjustable, adaptive, flicker filter which is universally applicable to all types of image content.

It is another object of the invention to reduce hardware and software requirements for implementing an effective flicker filter.

It is a further object of the invention to provide a flicker filter which does not produce additional image artifacts and may be implemented in a minimum of hardware and without requirement of on-chip microprocessor support.

It is yet another object of the invention to provide an interface of a flicker filter to other hardware provided in a set-top box and/or special purpose integrated circuits therein.

It is another further object of the invention to provide for display of a complex combination of images free of flickering artifacts by providing flicker correction for each image plane and regions therein without increase of memory bandwidth or storage hardware.

It is another further object of the invention to provide a filter for digital data having a rapidly computed filter transfer function capable of applying one of a plurality of correction factors to digital data in accordance with a plurality of thresholds without step discontinuities between the correction factors in the transfer function.

In order to accomplish these and other objects of the invention, a digital filter is provided for applying one of a plurality of correction factors to first digital data in accordance with a difference in value between the first digital data and second digital data, comprising an arrangement for determining an increase in value of a correction value within a range above a threshold, and an arrangement for summing that increase in value with a maximum increase in the correction value for each lower range of difference values.

In accordance with another aspect of the invention, a data processor is provided including and arrangement for clipping respective digital values to provide disallowed values of digital data, an arrangement for truncating the digital values by at least one least significant bit forming truncated digital values, and an arrangement for compressing the digital values by encoding a run length of sequential identical truncated digital values with the disallowed values of digital data in accordance with the clipping range and at least one bit replacing a truncated least significant bit.

In accordance with a further aspect of the invention, a data processing method is provided including steps of clipping digital signal values to a range forming clipped digital signal values and disallowed values, truncating at least one significant bit of the clipped digital signal values forming truncated digital signal values, and filtering respective values of digital data with corresponding truncated digital signal values.

BRIEF DESCRIPTION OF THE DRAWINGS

The foregoing and other objects, aspects and advantages will be better understood from the following detailed description of a preferred embodiment of the invention with reference to the drawings, in which:

FIG. 8 illustrates the preferred mode of use of the data compression scheme of FIG. 7.

DETAILED DESCRIPTION OF A PREFERRED EMBODIMENT OF THE INVENTION

Figure 1:
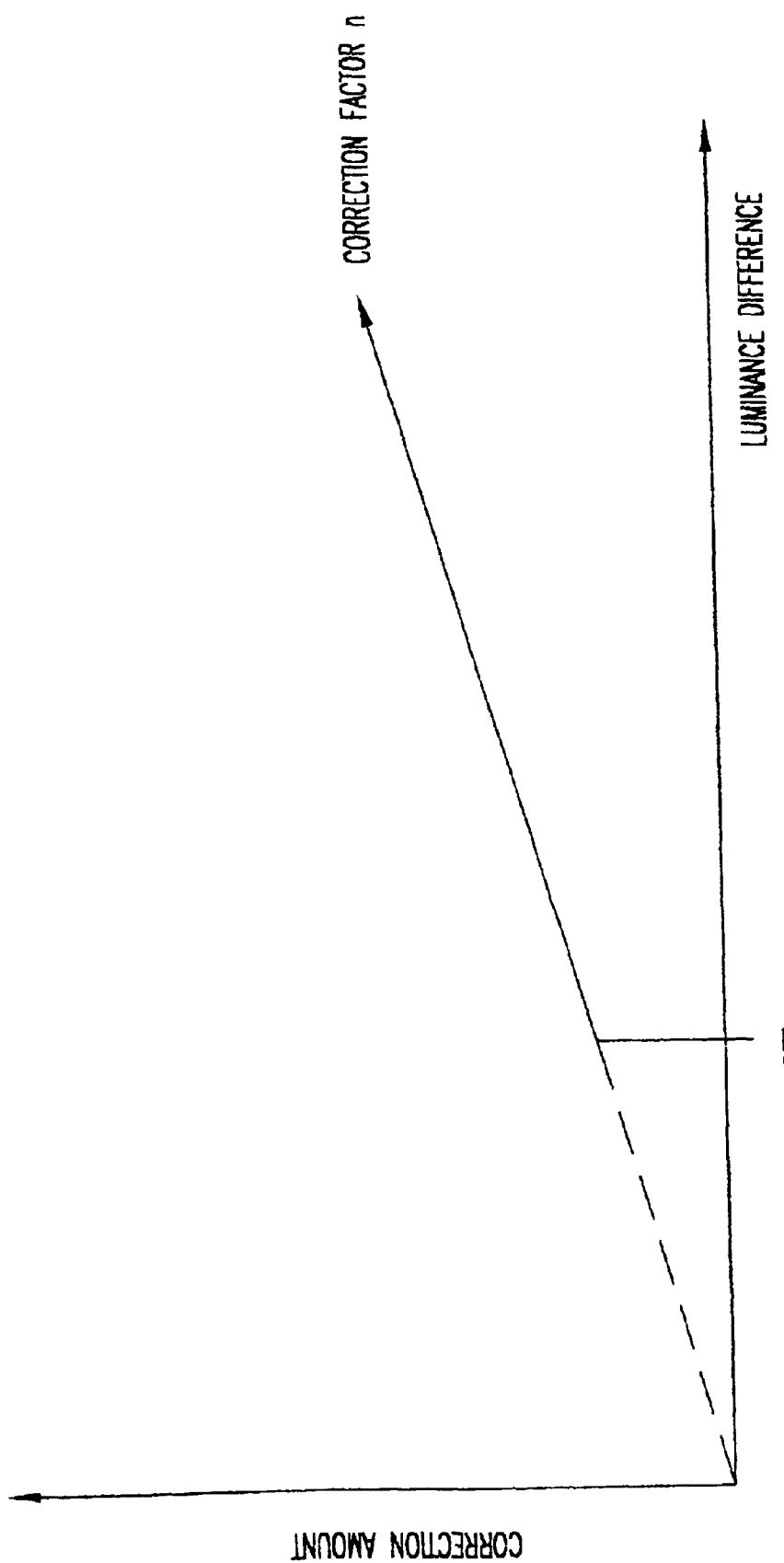
FIG. 1 is a graphical depiction of a know flicker filter transfer function.

Referring now to the drawings, and more particularly to FIG. 1, there is shown a graphical depiction of a known flicker filter transfer function as alluded to above, while this filter transfer function is effective to suppress image flicker in some cases, it does so at the cost of introducing a step artifact in the form of an abrupt change in luminance where luminance in the original image crosses a threshold along a luminance gradient. That is, in a gradually shaded area, a vertical observable border between areas of distinctly different luminance would be generated. Such an artifact would be manifested in other observable ways depending on the original image content.

The filter function shown in FIG. 1 does not suppress visible flicker of an interlaced raster display in all instances since only a single correction factor is available to be applied while the sensitivity of the eye is such that higher correction factors (corresponding to the slope of the transfer function to the right of the threshold) are required to suppress flicker for greater differences in luminance of vertically adjacent pixels.

Figure 2:
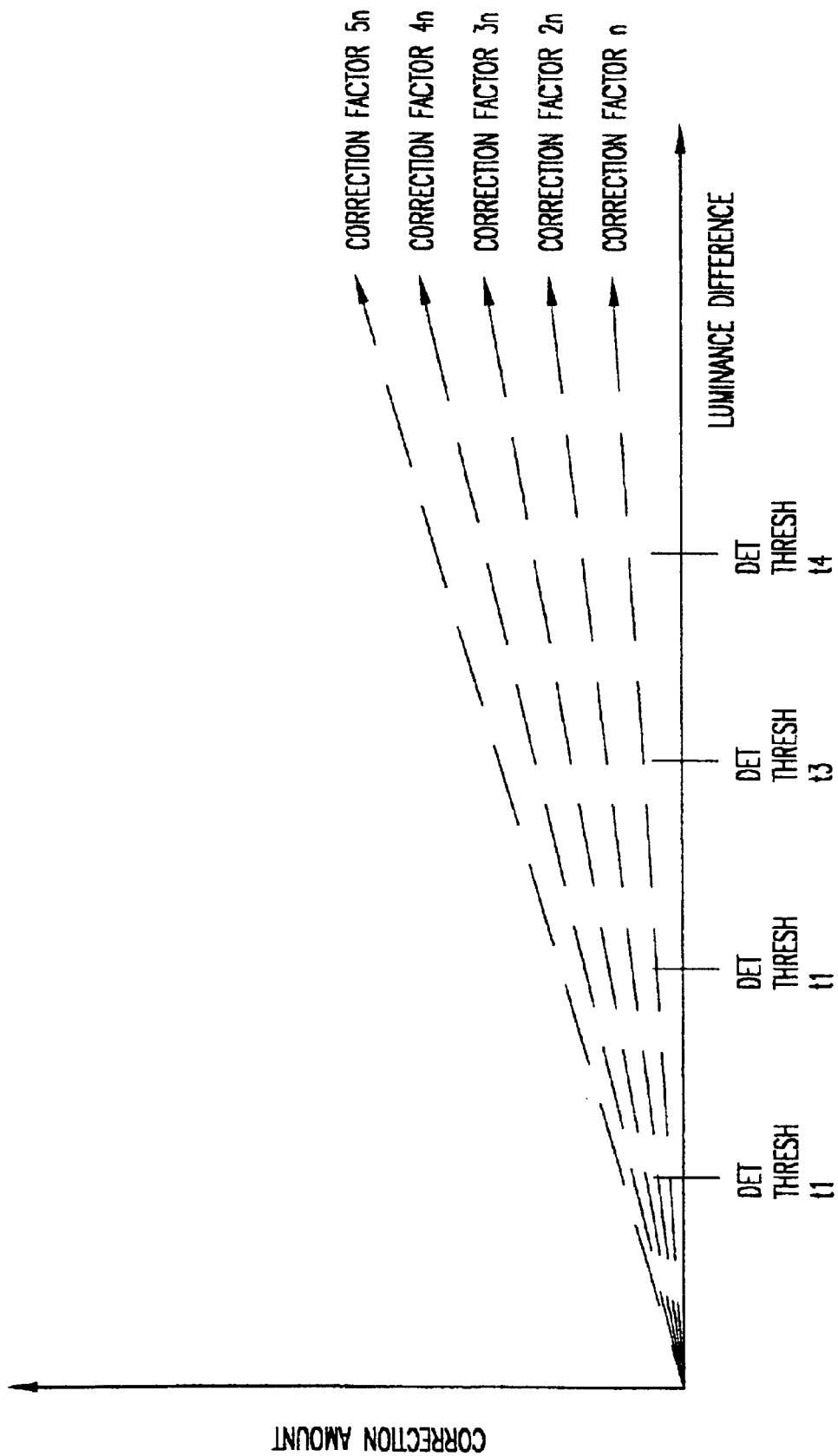
FIGS. 2 and 3 are graphical depictions of flicker filter transfer functions helpful to an understanding of the present invention.

Different correction factors are depicted in FIG. 2 by dashed lines of differing slopes. Filters for altering correction factor (e.g. introducing some degree of non-linearity) could be generated as indicated by the transfer functions shown as solid lines superimposed thereon in FIG. 3 by switching between correction factors at different thresholds in one of the transfer functions. However, such switching would also cause a step artifact in much the same manner as the filter of FIG. 1 at each threshold of luminance at which a given filter was switched. Switching between filters (e.g. between transfer functions) is not generally feasible or desirable within a single image or image plane. However, the change in correction factor at any threshold can be freely chosen.

Figure 3:
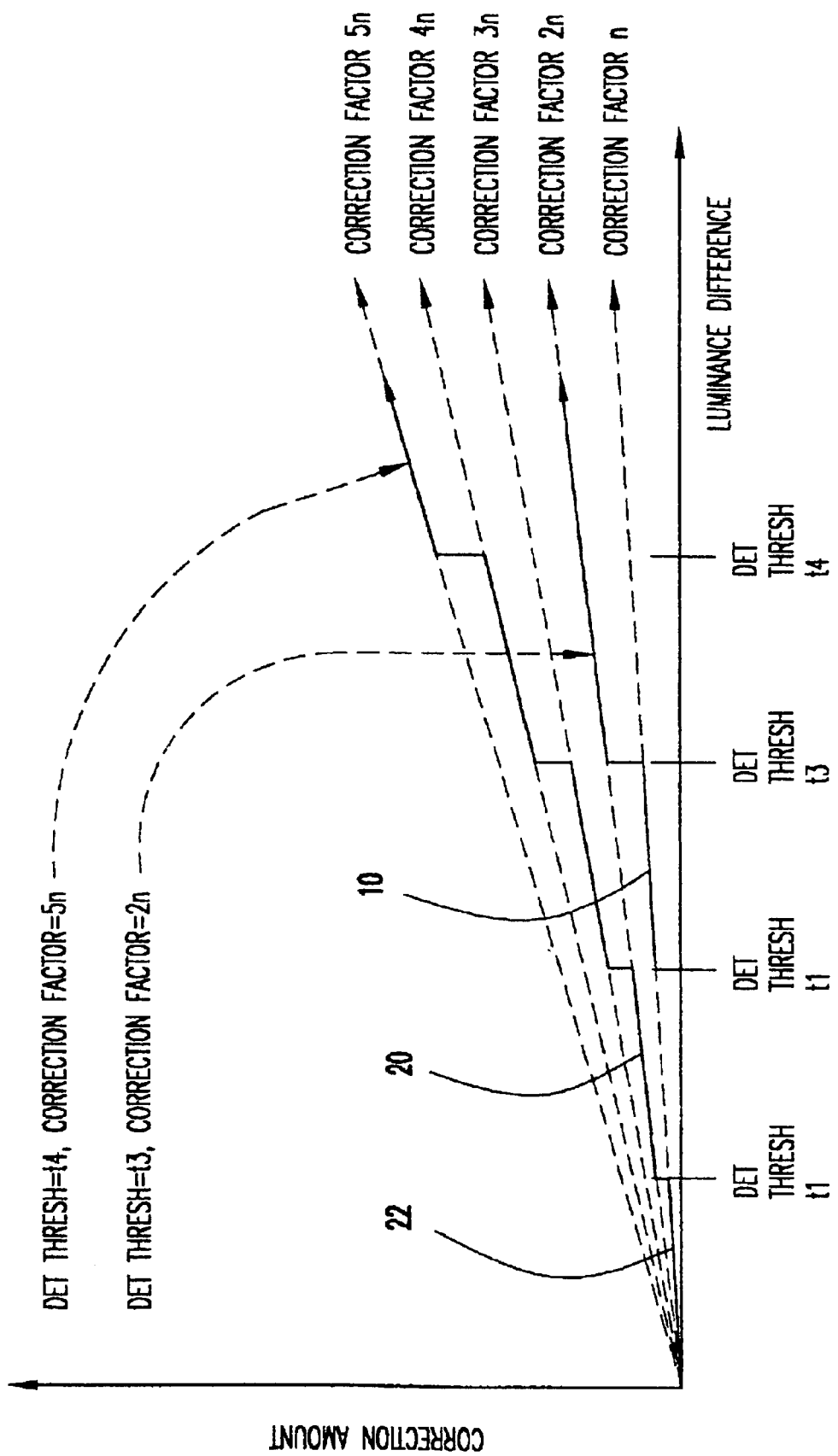

For example, below threshold t2 of FIG. 3, the filter transfer function 10 is functionally identical to that of FIG. 1 as would be the case for any transfer function which only applied a correction factor at and above a given threshold. Compare this function with segment 22 of filter transfer function 20 which follows correction factor n from minimum luminance levels. In other words, filter function 20 reduces contrast throughout the image and is generally undesirable for that reason, as well as the introduction of step artifacts. On the other hand, the greater the number of thresholds at which switching occurs increases the number of step artifacts but reduces their severity while allowing greater degrees of non-linearity to be provided in the filter transfer function (depending on the range of correction factors available) but greatly increases complexity of the structure needed to perform the correction computation.

The visibility of step artifacts cannot, as a practical matter, be avoided in these and similar approaches since the computational complexity and necessary hardware increases sharply with the number of thresholds at which switching is performed. The size of the steps thus generated (e.g. in FIG. 3) cannot be reduced consistent with provision of a sufficient range of correction factors to suppress flickering effects at medium and high luminance differences. At the same time, any step discontinuity, in theory, will produce an artifact due to undercorrection and overcorrection on opposite sides of the threshold and visibility of the artifact will increase with the size of the step discontinuity. Without a prohibitively large number of thresholds, the step discontinuities must be substantial in order to provide sufficient non-linearity to suppress flicker for large luminance differences. The provision of a smooth filter transfer function has not heretofore been possible without excessive computational complexity and hardware requirements.

Figure 4:
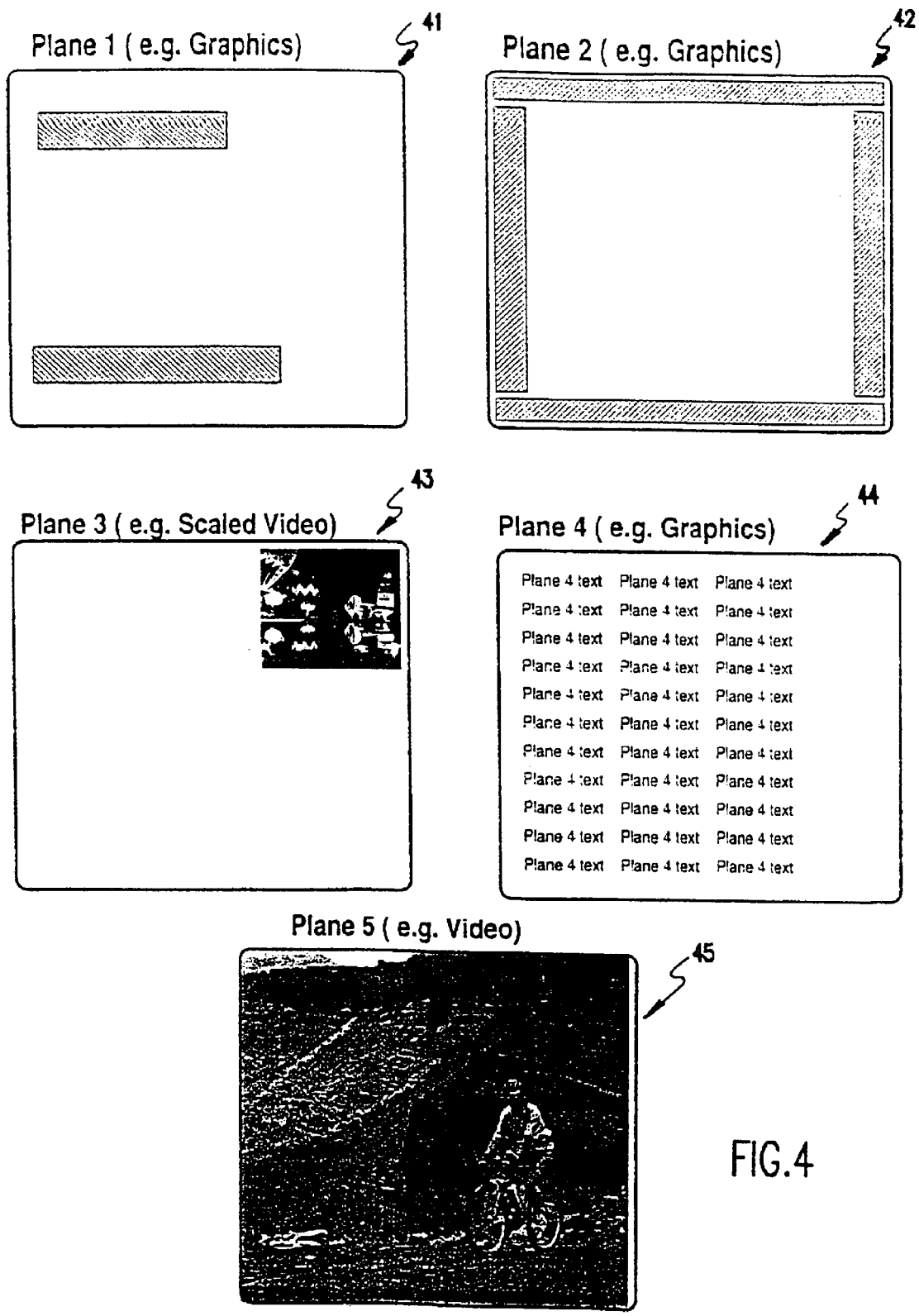
FIG. 4 illustrates plural image planes which may be included in a display and which are accommodated by the invention.
Figure 5:
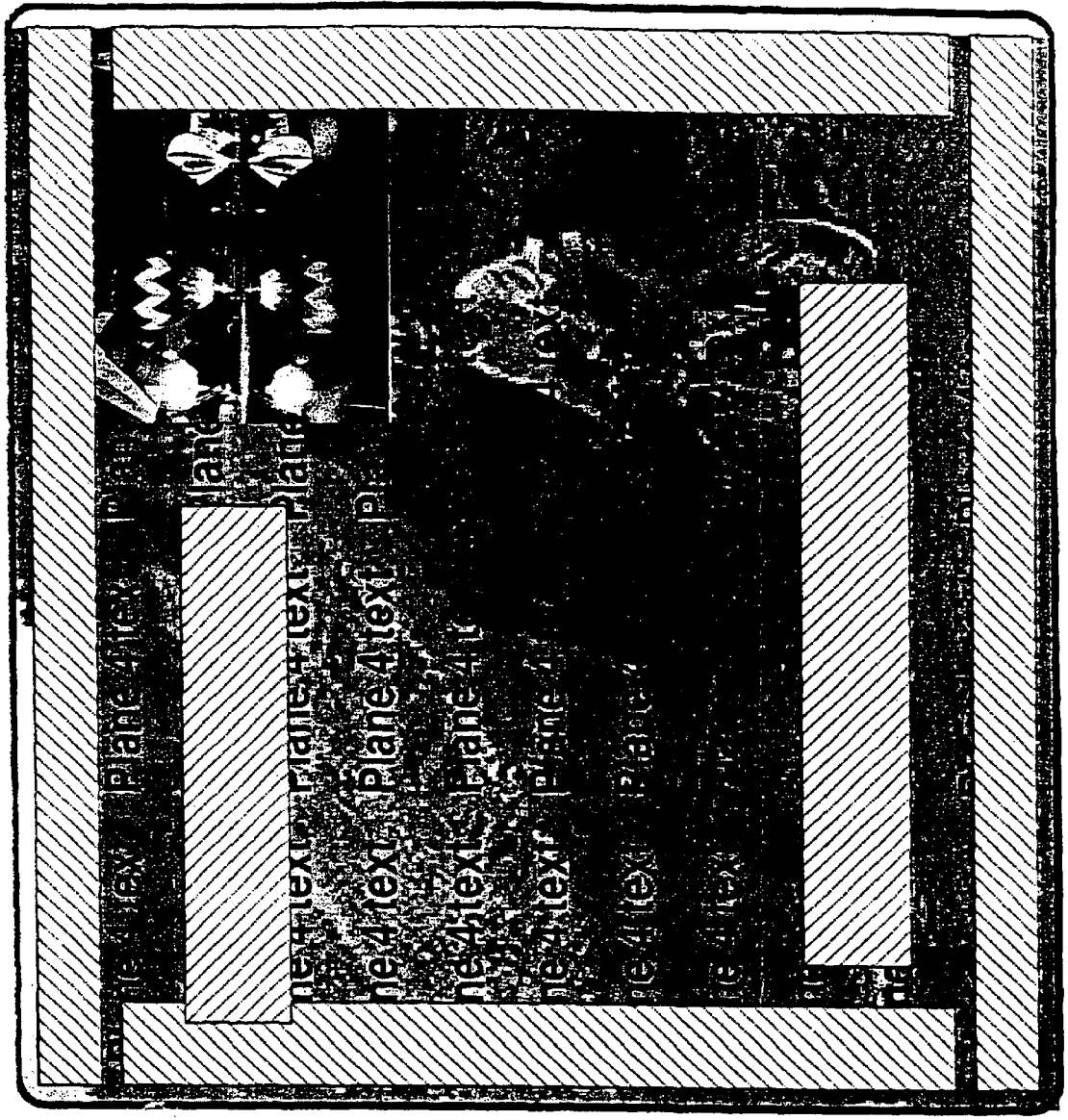
FIG. 5 illustrates a composite display including the image planes of FIG. 4.

Additionally, accommodation of multiple image planes is a requirement for a commercially acceptable set-top box. As alluded to above, five different exemplary image planes are shown in FIG. 4 and the composite image of these five image planes is shown in FIG. 5. The various image planes may be arranged in any order, generally processed by setting flags in the image information to indicate whether pixels in a particular plane are visible or occluded/overlaid by non-transparent areas in another image plane. Generally, each image plane will be effectively dedicated to having a particular type or limited number of types of image information.

Specifically, image plane 1 (41) shows two areas of graphics information such as might be provided for text (such as supertitles or subtitles) or graphs indicating the magnitude of measured image parameters, transmission quality measurements and the like. Similarly, Image plane 2 (42) shows four similar graphics areas such as made in the manner of those in image plane 1 (41) or, for example, video manipulation menus. Image plane 3 (43) depicts display of a reduced/scaled and selectively located video image (motion or still, computer generated or facsimile). Image plane 4 (44) shows a text overlay plane and image plane 5 (45) shows a full-screen video image (motion or still). FIG. 5 shows a composite image with image planes 4, 3, 2 and 1 overlaid in order on image plane 5.

It can be observed, for example, that the reduced video of image plane 3 (43) covers text of image plane 4 (44) and image plane 1 covers (occludes) portions of image planes 2 (42) and 4 (44). The overlay order (and content of any image plane), however, can generally be modified at will without disturbing other images in other image planes. It is also possible to mix or blend the images of these planes in any desired combination.

It should also be noted that, while specification of order among image planes is often provided, it may be preferable for purposes of economy or other considerations to avoid the complexity of hardware or processing to do so, as it is in the preferred embodiment of the invention. In this regard, many of the functions provided by full flexibility of specification of image plane order can be achieved in other ways. For example, to display a portion of an image plane covered by another image plane, display of the overlying image plane(s) can be suppressed. Likewise, alteration of order of image planes in the display can also be achieved by transferring image data between image planes which are permanently ordered.

Figure 6:
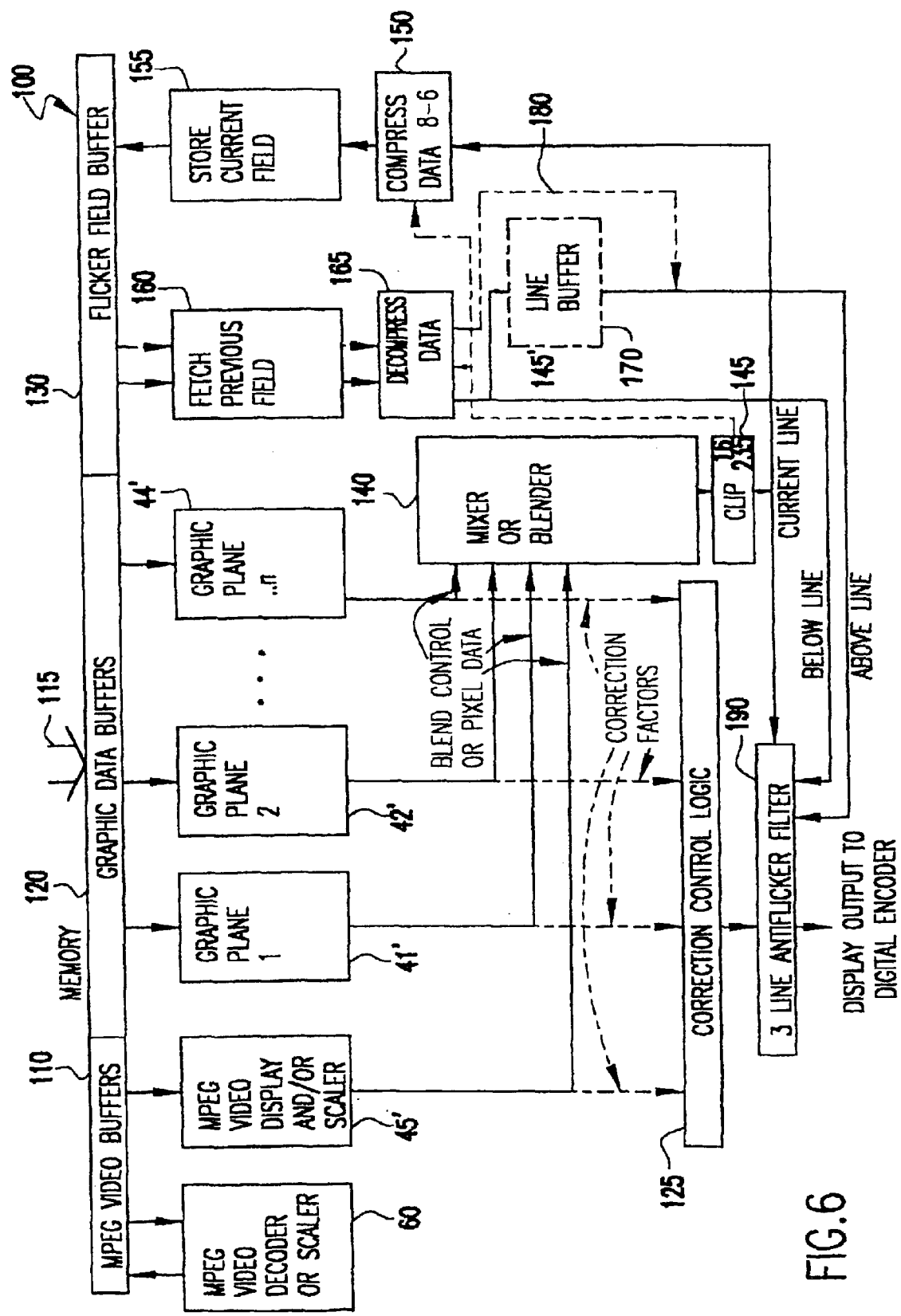
FIG. 6 is a schematic block diagram or high level flow chart illustrating a preferred form of the invention and operation thereof.

Referring now to FIGS. 6–10, a preferred embodiment of the invention will now be discussed. In particular, FIG. 6 is a flow diagram illustrating the application of anti-flicker filtering to the multiple image planes of FIGS. 4 and 5 will now be discussed. In the preferred implementation thereof, it is particularly convenient to compress the data as it is buffered for flicker filtering as will be discussed below in connection with FIGS. 7 and 8. Clipping is also preferably implemented to reduce data storage as well as to reduce flickering artifacts at the borders of opaque and transparent areas of image planes where one image overlies and occludes another, as will be discussed below in connection with FIG. 9. The preferred flicker filter transfer function will be discussed in connection with FIG. 10.

These aspects of the invention are preferably used in combination to provide additional meritorious effects, advantages and enhanced performance with reduced hardware and computational overhead. It will, however, be apparent to those skilled in the art that these aspects of the invention may be utilized separately or in various combinations with or without variations thereon which will also be evident to those skilled in the art in light of the following discussion.

As shown in FIG. 6, memory 100 is divided into three sections: An MPEG video buffer 110, a graphic data buffer 120 and a flicker field buffer 130. The specific form of these sections of memory, storage format, addressing arrangement, etc. are not important to the successful practice of the invention.

The MPEG video decoder or scaler 60 is generally well-understood in the art and need not be described in detail. However, a description sufficient to an understanding of this industry standard compression technique can be found in U.S. patent application Ser. Nos. 09/237,600 and/or 09/237,601, both filed Jan. 25, 1999, and assigned to the assignee of the present invention; both of which are hereby fully incorporated by reference. However, in general, it is sufficient to an understanding of FIG. 6 that the MPEG decoding process decompresses digital data in several stages and the processes employed in each stage are adaptive and/or variable under control of data transmitted in the MPEG signal to selectively accommodate the nature of the video image being transmitted and that video data is stored in an encoded and compressed form for economy of storage (although substantially decompressed from the digitally transmitted form). Hence, a bi-directional communication link is depicted between MPEG decoder 60 and MPEG video buffers 110.

It should also be understood that while MPEG is a currently preferred industry standard, the practice of the invention does not rely on the particulars of any transmission or compression technique. That is, it is sufficient to the practice of the invention that video information in some usable format be provided from MPEG video buffer 110 to MPEG video display buffer/control 45'. Video data from the same or a similar source could be provided to one or more other image plane buffers/controls (e.g. for scaled video plane 3) as well. Again, it is sufficient to the practice of the invention that either memory section 110 or 120 receive displayable video or graphics from some source, more generally depicted at input 115 to memory 100, of which MPEG decoder 60 is exemplary.

The buffers/controllers 41'–45' for the respective graphics planes (e.g. 1–5 or 1–n) thus receive displayable signals from the MPEG video buffer(s) 110 and/or graphics data buffers 120. The buffers/controllers may be of any configuration or constitution but generally include the facility of storing flags and data indicating at least display location, transparency of particular areas therein, priority between planes (e.g. pointers to overlying and underlying planes) and other information for controlling presentation such as false color, color keys and signals to control blending or other interaction between planes and other control signals as may be desired. It is, however, important to an understanding of the preferred embodiment of the invention that flicker correction factors and luminance difference thresholds also be included to allow the programmer and/or possibly the user to apply flicker filtering correction as may be desired or deemed appropriate (if any) to the type of data in each image plane.

The image data from each image plane, including control data therein is provided to a video mixer or blender 140 which is well-understood in the art and may be arranged in many different ways. Mixer or blender 140 may combine the pixel data of different planes in various ways (e.g. an alpha blending control) and/or provide that one plane opaquely overly another. The correction factors and threshold values (and plane priority data and/or blending control data, if any) specified by the programmer/user, however, are provided from the respective image planes to correction control logic 125 which determines which correction factor(s) are to be applied to a particular pixel if flicker filtering is required, based upon the pixel from the respective image planes which is most prominently displayed.

The particular logic arrangement for achieving this function is not critical to the practice of the invention and may simply be a selection of the foremost non-transparent pixel. However, it is preferred that when two pixels are being blended together by, for example, an alpha control and two possible correction factors or sets of correction factors are available, that the larger of the applicable values be chosen to provide the greater of the two possible amounts of correction. This choice ensures that no flicker artifacts will escape through the filter, assuming that the correction factors have been correctly chosen for the image planes and regions therein. (The provision of different correction factors for different regions is respective image planes is discussed in U.S. patent application Ser. No. 09/094,753, filed Jun. 15, 1998, assigned to the assignee of the present invention, and which is hereby fully incorporated by reference.) Thus the best correction factor(s) from among the various image planes will be chosen.

Figure 7:
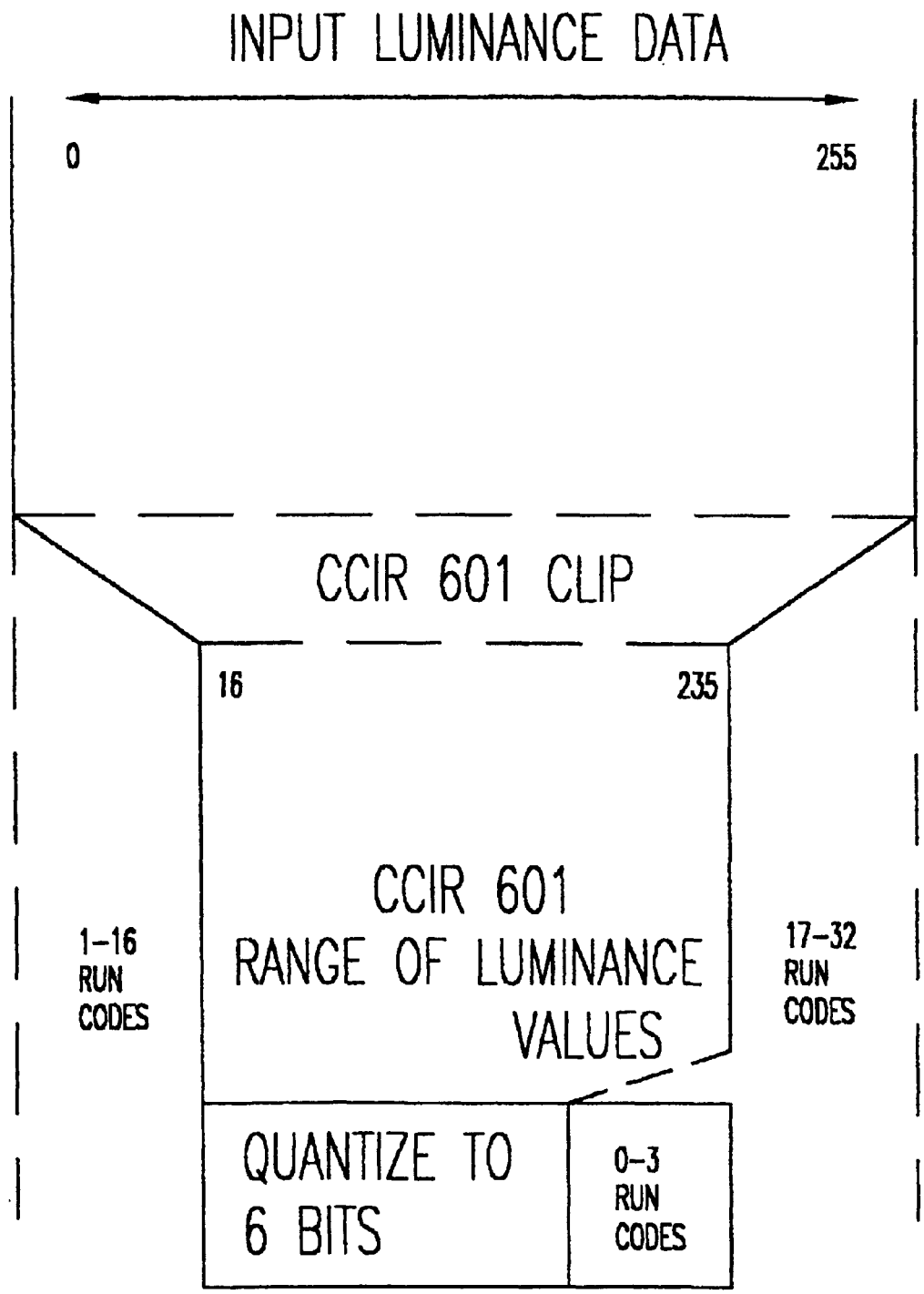
FIG. 7 illustrates a preferred form of data compression in accordance with an aspect of the invention.
Figure 9:
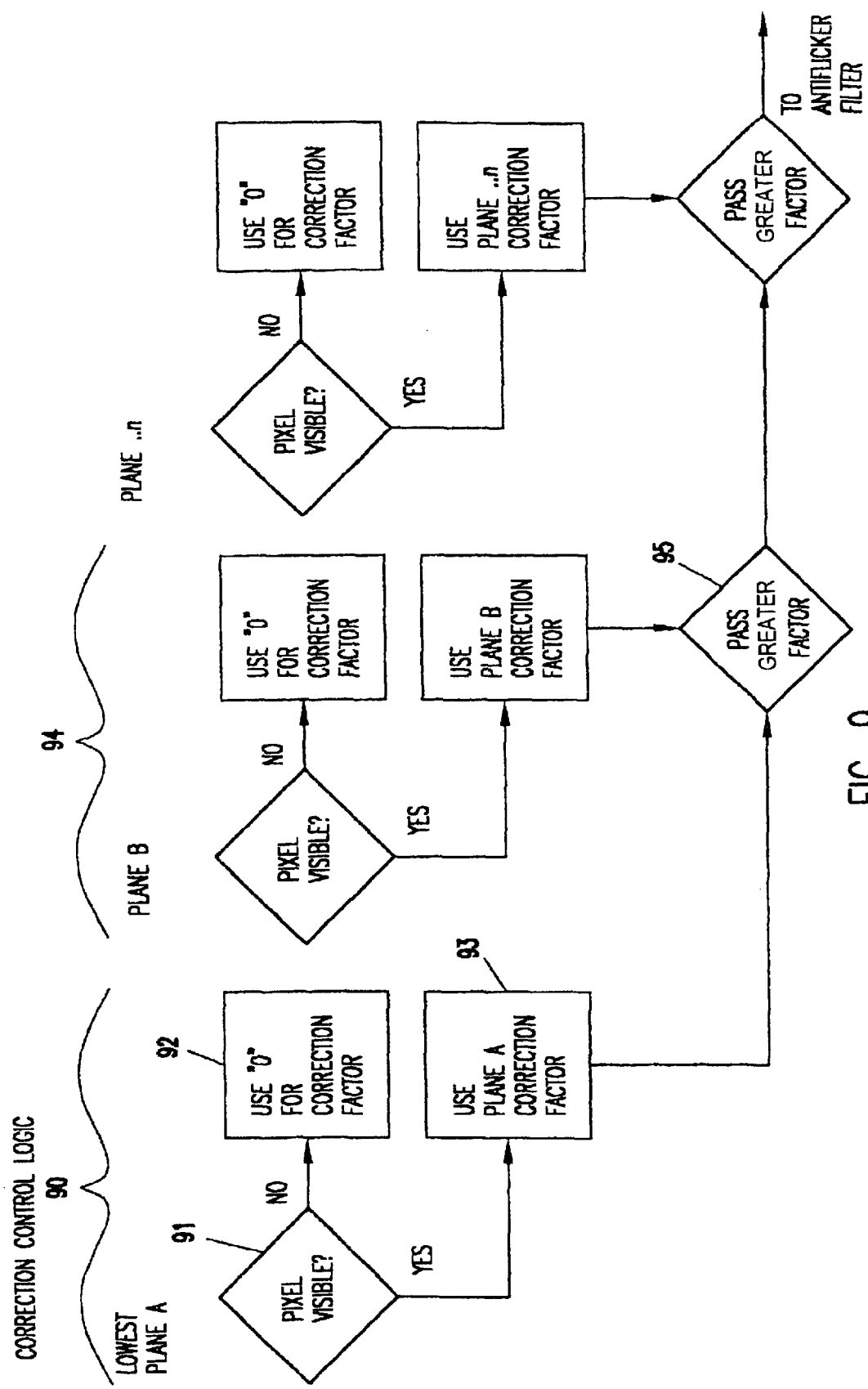
FIG. 9 illustrates the accommodation of plural image planes of FIG. 4 in the video processing arrangement of FIG. 6, FIG. 10 graphically illustrates a preferred form of the flicker filter transfer function developed in accordance with the invention.
Figure 10:
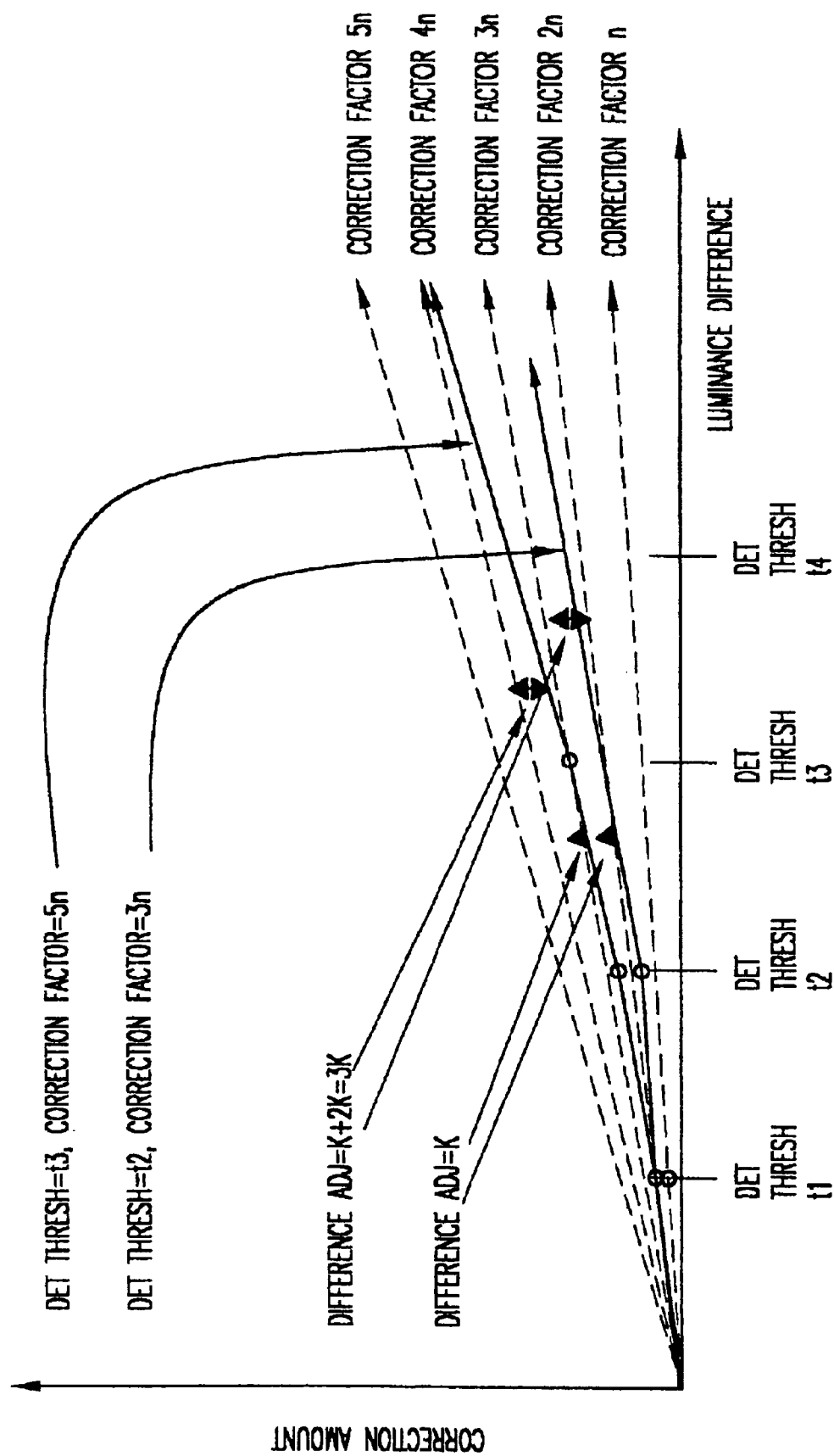

The mixer/blender 140 thus outputs (preferably eight-bit) luminance values (and chrominance values, which are not affected by or operated upon by the invention) to clipping circuit 145. The action of the clipping circuit 145 is illustrated in FIG. 7. A preferred form of clipping is referred to as the CCIR 601 standard which, for luminance values of 0–255 for an eight-bit luminance value, limits the usable/ allowed values to 16–235, inclusive. The disallowed luminance values 0–15 and 236–255 can then be detected and interpreted as signals directed to other purposes. In accordance with the invention, thirty-two of these unused/ disallowed luminance values are interpreted as run length codes to allow data compression for storage; permitting a compression ratio of up to 16 (e.g. a luminance byte and a run length byte for up to 32 identical pixels).

It should be noted that more than thirty-two unused/ disallowed luminance values are provided by clipping under the CCIR 601 standard. However, it is preferred, as a matter of hardware and processing economy to limit the run length values to thirty-two. It should also be noted that compression by use of these otherwise unused or disallowed luminance values cannot be performed unless these values are made available by clipping although some other compression arrangement might be employed. Therefore, the availability of certain luminance values (in accordance with any particular clipping standard or technique currently in use) is preferably communicated from clipper 145 to both compression and decompression arrangements 150, 165 as indicated by dashed arrows 145' to control the compression technique and arrangement that may be used, such as that which will now be described.

An enhancement of this clipping standard is provided in the preferred embodiment of the invention to provide substantial savings in hardware for detection while increasing compression ratio and increasing the maximum potential compression ratio. Specifically, it has been found that determining a correction factor for flicker filtering based on luminance data that is further quantized by removing the two least significant bits (LSBs) does not result in a perceptible artifact since it is the luminance difference value to which the correction value is applied (and, in any event, a correction, as such, should be limited to a small fraction of the luminance value difference, particularly if, as is preferred, a separate correction is applied from each of the pixels above and below the current picel). Therefore, the two LSBs truncated from the luminance value are available to provide a repetition code/value of between 1 and 4 which can be included with a luminance value of 16 to 235 within an eight-bit byte.

Additionally, two easily detectable values which are disallowed after clipping can be used as flags. That is, if the four most significant bits (MSBs) of an eight-bit byte are all "0", the value must be a disallowed value between 0 and 15, inclusive. Similarly, if the four MSBs are all "1", the value must a disallowed value between 239 and 255, inclusive. These values could be used directly to specify repeat values of 1–32 directly but requires an additional luminance byte (limiting compression ratio to sixteen) and does not result in significant compression for short run lengths (e.g. low numbers of repeated luminance values).

For example, if a run of two identical luminance values (after truncation to six bits) were encoded as a luminance value within a first eight-bit byte and a repetition value of "one" were to be encoded as a second eight-bit byte, there would be no effective compression or savings in storage space over providing the luminance value twice while substantial decoding complexity would be incurred. Some compression gain could be obtained by only providing repetition values greater than two but other complexities would be encountered and the overall compression ratio would not be optimal.

In accordance with a preferred form of the invention, however, substantial compression for short run lengths can be achieved by encoding repetition values 0–3 (e.g. 1–4 identical luminance values) in the truncated LSBs of the luminance value so that both luminance and run length of up to four can be encoded in a single eight-bit byte. This provides a compression ratio of between 2 and 4 even for very short run lengths of four or fewer repeated pixel luminance values. Run lengths of 5 to 32 can be encoded using flags as described above which ensure a compression ratio of at least 2.5 (two bytes for a run length of five pixels of identical value.

It should also be appreciated in this regard that long runs of similar pixel values (often exceeding thirty-two pixels) are commonly encountered and truncation of luminance values to six bits increases the likelihood that (lower resolution) luminance values will be identical. By the same token, run lengths of more than 32 identical luminance pixels require only one additional eight-bit byte to indicate up to 32 additional identical luminance pixels (e.g. 32 to 64 identical pixels can be encoded in three bytes, 54 to 96 identical pixels can be encoded in four bytes and so on). Thus, in theory, the compression ratio can asymptotically approach a compression ratio of 32 for long strings of identical luminance bytes.

The effect of this preferred encoding arrangement is demonstrated in FIGS. 7 and 8. In FIG. 7 luminance values of 0–255 are clipped at 145 to values of 16–235. That is, luminance values of 0–15 are represented by a value of 16 and luminance values of 236–255 are represented by a value of 235 while values other than 16–235 are disallowed (but still represented by an eight-bit byte). These eight-bit values are further quantized at compression element 150 by truncating the two LSBs from the luminance value and using those bits of the eight bit byte as a run length code for run lengths of one to four.

This is shown for pixels numbered 1–8 in FIG. 8 in which one pixel (#1) has a luminance value of A, pixels #2 and #3 have a luminance value of B, pixel #4 has a luminance value of C and pixels #5–#8 have a luminance value of D. Pixels #1 and #4 have unique luminance values which are not repeated and are encoded as a six-bit luminance value and a two-bit run length value "00" indicating a run length of one or a repetition value of "0". Pixels #2 and #3 are of the same luminance value and are encoded, upon detection of repetition (hence the code is associated with Pixel #3) as a six-bit luminance value and a run length value of "01".

This compression is extended, as discussed above when the luminance value of D is detected to persist for an additional sixteen pixels. Since this repetition value is sixteen or less, the "0000" (MSBs) flag is used and the four LSBs of the eight-bit byte (in this case "1111") encode the additional sixteen repeats of the same luminance value specified in association with pixel #8. Similarly, the first four repeated luminance values of value E (pixels #25–#28 are similarly encoded in association with pixel #28 and, upon detection of the continuance of that luminance value for an additional 32 pixels (through pixel #60) the "1111" MSB flag is used since the number of repetitions is greater than sixteen and repetition values of 17–32 pixels are encoded in the following four LSBs. Thus an eight-bit byte composed of either a six-bit luminance value concatenated with a two-bit run length or one of two four bit flags concatenated with a four-bit run length code provides a minimum compression ratio of two and a maximum compression ratio of thirty-two for other than unrepeated luminance values.

This compression arrangement and technique is not necessary to the successful practice of the invention but is much preferred since it is considered substantially optimal in terms of hardware economy, storage efficiency and processing convenience while introducing no perceptible artifacts in the displayed image. While some potential redundancy is present in that short run lengths could be encoded in association with flags, discussed above but are not used, this technique provides an enhanced compression ratio for short run lengths (by allowing both luminance and the short run length to be encoded in a single eight-bit byte) while doubling the maximum potential compression ratio to an extremely high value of thirty-two and increasing the run lengths likely to be found due to truncation of the luminance value. In practice, this technique has been found to sufficiently reduce the memory access bandwidth that other hardware reductions and simplifications may be obtained by omission of line buffer 170 which will be discussed below.

It should also be recognized that, while this compression technique and arrangement has been discussed above in connection with an eight-bit byte, the CCIR 601 clipping standard and a two bit truncation and quantization of luminance values, the principles of the invention are applicable to other byte sizes and other quantization increments and signal processing standards. However, the sufficiency of luminance resolution, storage sufficiency and other aspects of the performance of this arrangement, particularly in support of flicker filtering, strongly suggest that no significant advantages would be obtained by such modifications other than the accommodation of other standards or functions of the transmission decoder. Nevertheless, the principles of the compression technique and arrangement in accordance with the invention can readily be adapted to accommodate any such circumstances.

After compression has been performed, the current line of the display is stored in flicker field buffer 130 under control of write controller 155. The particulars of the configuration of flicker field buffer 130 are not particularly important to the practice of the invention but a capacity sufficient to store an entire interlaced field of a display frame and asynchronous and non-sequential read and write accesses should be provided. In this latter regard, compressed data will become available for storage at irregular intervals depending upon run lengths, as may be observed from FIG. 8 discussed above, and repetition codes using flags that are read from memory may require a further access to a previously read byte containing a luminance value.

As is generally recognized in the art for purposes of flicker reduction, the luminance values of pixels above and below the current pixel are evaluated to determine a correction value, if any, which may be required to suppress flicker. Alternatively put, the pixels above and below a current pixel are displayed with the greatest time separations from the current pixel since they are produced in alternating interlaced fields of a display frame. Thus significant differences in luminance as these adjacent pixels are produced with a substantial time separation results in the flickering which is perceived.

In order to compare luminance values of pixels which are vertically adjacent to the current pixel, the previous field is read from flicker field buffer 130 by a read controller 160 and decompressed at 165. Depending on the raster pattern, the line below the line of the current pixel can be used again as the line above the current pixel when the current pixel moves to the next line of the display. Therefore, a line buffer 170 is normally provided to reduce the number of memory accesses (which, for uncompressed data would be twice the write rate unless a line buffer was provided.

However, as alluded to above, the compression arrangement described above provides a minimum compression ratio of two for any run length greater than one and will often approach the maximum compression ratio of thirty-two over an entire display line as read from memory. Therefore, if sufficient bandwidth reduction has been achieved through compression relative to the memory access bandwidth, which will generally be the case, line buffer 170 can be omitted and the lines above and below the current pixel can be directly accessed as indicated by the dashed arrows from flicker field buffer 130 through read controller 160 and decompression 165 to the "above line" connection to the three line anti-flicker filter 190.

The three-line anti-flicker filter 190 thus receives the current line at eight-bit luminance resolution from clipper 145, the below line from decompression arrangement 165 and the above line from either the decompression arrangement 165 or line buffer 170, depending on the memory access bandwidth relative to the bandwidth of the compressed data. The correction control logic 125 supplies one or more correction factors and thresholds to anti-flicker filter 190, preferably on a pixel-by-pixel basis, in accordance with the values specified for the most prominently displayed image plane or blend of image planes, as alluded to above.

It should be recalled that the image contributions of all image planes (e.g. 41–45) have been reduced to a composite display image frame by mixer/blender 140. If the order of the image planes is alterable at the will of the operator, the mixer/blender 140 would be required to communicate the plane or planes from which each displayed pixel was derived to the correction control logic 125 in order to control selection of the corresponding correction values and thresholds. However, as alluded to above, this complexity is not necessary to the development of many of the functions desired from the use of multiple image planes and a fixed order of image planes is thus preferred and the correction factor and thresholds may thus be directly controlled based on the image planes from which the correction factors and thresholds are received as will now be discussed in connection with FIG. 9.

Beginning with the lowest priority plane (e.g. the full frame video plane 45 of FIGS. 4 and 5) it is determined if the pixel is visible based upon a non-transparent pixel being specified in a higher image plane as illustrated at 91. If the pixel is not visible, a correction factor of "0" is specified as shown at 92 since any image value in that plane cannot contribute to flicker of that pixel in the image. If the pixel is visible, the correction factor(s) and threshold(s) set by the operator for the image in that image plane is output as shown by 93. This process indicated by bracket 90 is then repeated for the next lowest image plane as indicated at bracket 94 and the larger of the outputs of processes 90 and 94 (either or both of which could be "0") is determined and passed as indicated at 95 and the process repeated for each consecutively higher image plane until all image planes have been evaluated.

It should be noted that this process also satisfies the criterion alluded to above when image planes are blended by providing the higher or highest correction factor among the blended planes which assures that no luminance differences which would cause flicker escape the flicker filter (assuming correction factors have been correctly specified by the operator/user.

The foregoing has demonstrated a preferred technique and arrangement for developing a composite image from a plurality of image planes, storing an interlaced field efficiently in a compressed form supporting realization of an extremely high compression ratio and potentially low memory access bandwidth, generally allowing the further hardware simplification of eliminating a line buffer 170. This function is achieved while delivering all data necessary for flicker filtering to a flicker filter 190 including correction factors and thresholds functionally adjustable and adaptive to particular types of images to suppress flickering without significant compromise of image detail or other image degradation or introduction of perceptible image artifacts. However, as alluded to above, the limitations on available signal processing for performing flicker filtering have not provided an effective flicker filter that is similarly free from the introduction of artifacts and the imposition of trade-offs of severity among such artifacts.

As discussed above, a principal image artifact introduced by known anti-flicker filters is edge artifacts due to discontinuities in the filter transfer function at luminance difference thresholds, particularly where the filter transfer function switches among a plurality of correction factors in order to approximate non-linearity necessary to apply larger correction factors for larger luminance differences. The preferred flicker filter in accordance with the present invention provides non-linearity of the filter transfer function in a piece-wise linear but continuous fashion approximating a smooth curve without the step discontinuities which have been characteristic of known flicker filters as illustrated in FIGS. 1–3 and discussed above.

The filter transfer function in accordance with the invention does not present discontinuities when simply implemented in hardware or software while providing a filter that is both adjustable (since correction factors may be changed at will) and adaptive (since switching between correction factors at multiple thresholds is provided). In this regard, many more thresholds and correction factors may be readily implemented in software to emulate a quadratic function since the family of equations discussed below can be iterated and correction values computed on-the-fly for a large number of thresholds. Alternatively, correction values may be pre-computed and retrieved from memory for a large number of luminance differences. The non-linearity can be freely shaped (although it is, by nature, generally quadratic), as desired for any particular type of image content.

In accordance with an algorithm which can be rapidly computed with a small amount of preferably special purpose processing circuitry, the required correction factor is essentially accumulated at threshold values between the luminance values. By doing so, step discontinuities in the transfer function can be eliminated while limiting the computations other than determining the difference of luminance values to additions and multiplications and a single division by a power of two which can be accomplished by bit shifting.

In practice, since the values 1, 2, 3, 4 and 5 can be represented in three bits, a maximum of two of which are logical "1", multiplication is not performed but, rather, emulated by bit shifting and a maximum of two addition operations which can be executed much more rapidly than multiplication. The computation process and hardware are further simplified since it is preferred that only the six MSBs of the luminance value are stored, recalled and used in computing the correction factor, consistent with the compression technique and arrangement discussed above.

Specifically, six bits of luminance data provide sixty-four discrete quantized luminance values between luminance values of 1–255 and may be clipped to, for example 16–235. It is computationally convenient to partition the sixty-four quantized values into groups or ranges of sixteen values each at equally spaced thresholds. However, it is to be understood that more or fewer partitions could be provided and the thresholds unequally spaced, as may be desired or found to be effective for particular types of image content. The filter transfer function is thus a family of functions having two parameters, a correction level/value (COR) and a number of linear sections (DET+1), numbering one more than the number of thresholds by which they are separated. This family of functions may be expressed mathematically over the ranges 0–16, 16–32, 32–48 and above 48 and follows:

Adjustment=(MIN(16, difference)*(COR−1)+MIN(16, MAX(difference−16,0))*(COR)+MIN(16, MAX(difference−32, 0))*(COR+1)+MAX(difference−48,0)*(COR+2))/16     DET=3

Adjustment=(MIN(16, difference)*(COR)+MIN(16, MAX(difference−16,0))*(COR+1)+MAX(difference−32,0)*(COR+2))/16     DET=2

Adjustment=(MIN(16, difference)*(COR+1)+MAX(difference−16, 0)*(COR+2))/16     DET=1

Adjustment=difference*(COR+2)/16.     DET=0

As can be appreciated from the mathematical expressions of this family of functions, the correction value for any luminance difference within any range is the sum of the increase in value within the particular range and the summation of the maximum change in value of all lower ranges. Therefore, the filter transfer function is piecewise linear (for constant correction factors within each range although they could be variable and non-linear) and continuous without step discontinuities. Thus, the flicker filter in accordance with the invention is effective to suppress flicker regardless of image content type and does not engender artifacts or degrade image detail.

This technique and algorithm is not limited to digital video transmission systems and set-top boxes but can be easily employed in any environment where artifacts are caused by differences in signal values, such as where an interleaved raster is used for display. Thus the invention has particular utility in digital video disk (DVD) players, web TV, computer monitors and the like. Further, in the environment of a set-top box, the invention is entirely compatible with provisions that may be made for reordering of planes, alluded to above, even though such a provision is not preferred at the present time.

In view of the foregoing, it is seen that the flicker filter in accordance with the invention provides effective flicker filtering without engendering other artifacts within the limitations of simple storage and processing circuitry economically includable in a set-top box of a digital video/graphics transmission system. Each of the data handling, compression, storage, image planes accommodation and filter transfer function provides an improvement over their known counterparts and, together, provide effective flicker filtering while reducing hardware and computational requirements.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A digital filter for applying one of a plurality of correction factors to first digital data in accordance with a difference in value between said first digital data and second digital data, said filter comprising
   means for determining an increase in value of a correction value according to said difference within a range above a threshold, and
   means for summing said increase in value of said correction value with a maximum increase in said correction value for each lower range of difference values.

2. A digital filter as recited in claim 1, wherein said rang and said lower ranges are defined by threshold difference values.

3. A digital filter as recited in claim 1, wherein said first and second digital data are image luminance values.

4. A digital filter as recited in claim 3, wherein said image luminance values are luminance values of adjacent pixels in a direction orthogonal to a raster line.

5. A digital filter as recited in claim 1, wherein said second digital data is truncated by a least significant bit.

6. A digital filter as recited in claim 1, wherein a range of possible values of said first and second data is clipped, providing disallowed values of said first and second digital data.

7. A digital filter as recited in claim 6, wherein said second digital data is truncated by at least one least significant bit.

8. A digital filter as recited in claim 6, further including means for storing said first digital data and accessing values thereof as said second digital data.

9. A digital filter as recited in claim 8, further including means for compressing said first digital data by encoding a run length of sequential identical values in accordance with said disallowed values.

10. A digital filter as recited in claim 7, further including means for storing said first digital data and accessing values thereof as said second digital data.

11. A digital filter as recited in claim 10, further including means for compressing said first digital data by encoding a run length of sequential identical values in said at least one bit truncated from said second digital data.

12. A digital filter as recited in claim 11, further including means for compressing said first digital data by encoding a run length of sequential identical values in accordance with said disallowed values.

13. A digital filter as recited in claim 12, wherein one of said disallowed values in a flag indicating compression in accordance with another of said disallowed values.

14. A digital filter as recited in claim 4, wherein said first digital data represents one of a plurality of image planes and further includes at least one said correction factor associated with a region of an image in said image plane.

15. A data processor for digital data compression including means for clipping respective digital values to provide disallowed values of digital data, means for truncating said digital values by at least one least significant bit forming truncated digital values, and means for compressing said digital values by encoding a run length of sequential identical truncated digital values with said disallowed values of said digital data and at least one bit replacing said at least one least significant bit.

16. A data processor as recited in claim 15, wherein at least one said disallowed value is a flag indicating encoding of a run length as another disallowed value.

17. A method of processing digital data including steps of truncating at least one least significant bit of clipped digital signal values forming truncated digital signal values, and filtering respective values of said digital data, said filtering being performed using corresponding ones of said truncated digital signal values to determine a correction factor and a correction value for each of said respective values in accordance with a filter transfer function, suppressing flicker without engendering artifacts regardless of image content, when said digital data represents video information.

18. A method as recited in claim 17, wherein said filtering step is performed with each of two of said truncated digital signal values.

19. A method as recited in claim 18, including the further steps of clipping digital signal values to a range forming clipped digital signal values and disallowed values, and compressing said truncated digital signal values in accordance with run length codes using said disallowed values and said at least one least significant bit.

20. A method as recited in claim 18, including the further step of deriving one of said two signal values by storing another of said truncated digital signal values in a buffer for the duration of a scan line.

21. A method as recited in claim 17, including the further step of storing said truncated digital signal values in a form encoded with said disallowed values.

22. A method as recited in claim 17, wherein said filtering step includes summing an increase in value of a correction factor in a range of difference values between a value of said digital data and a corresponding truncated digital signal value with a maximum increase in said correction value for each lower range of difference values.

23. A method as recited in claim 18, wherein said filtering step includes summing an increase in value of a correction factor in a range of difference values between a value of said digital data and a corresponding truncated digital signal value with a maximum increase in said correction value for each lower range of difference values.

\* \* \* \* \*